United States Patent
Kronhamn

Patent Number: 5,512,909
Date of Patent: Apr. 30, 1996

[54] METHOD AND DEVICE FOR DETERMINATION OF DIRECTION

[75] Inventor: Thomas R. Kronhamn, Hälsö, Sweden

[73] Assignee: Telefonaktiebolaget LM Ericsson, Stockholm, Sweden

[21] Appl. No.: 343,908

[22] Filed: Nov. 17, 1994

[30] Foreign Application Priority Data

Nov. 17, 1993 [SE] Sweden ................................. 9303808

[51] Int. Cl.⁶ .................................................. G01S 5/02
[52] U.S. Cl. .......................... 342/417; 342/56; 342/108; 342/147
[58] Field of Search ............................ 342/56, 108, 113, 342/145, 146, 417, 147

[56] References Cited

U.S. PATENT DOCUMENTS

| | | | |
|---|---|---|---|
| 3,868,691 | 2/1975 | Miller et al. | 343/103 |
| 3,947,803 | 3/1976 | Brown | 340/6 R |
| 4,028,699 | 6/1977 | Stevens | 343/5 |
| 4,613,865 | 9/1986 | Hoffman . | |
| 4,633,261 | 12/1986 | Kosaka et al. . | |
| 4,888,593 | 12/1989 | Friedman et al. | 342/387 |
| 4,891,648 | 1/1990 | Jehle et al. . | |
| 5,061,930 | 10/1991 | Nathanson et al. | 342/13 |

FOREIGN PATENT DOCUMENTS 59-46565  3/1984  Japan .

Primary Examiner—Thomas H. Tarcza
Assistant Examiner—Dao L. Phan
Attorney, Agent, or Firm—Burns, Doane, Swecker & Mathis

[57] ABSTRACT

A method for determining the direction to a signal source by cooperation between a first device which determines the direction to the signal source with a low angular accuracy and a second device which determines the direction to the signal source with a high angular accuracy. In a first step, the direction to the signal source is determined within a certain angular range and, through analysis of the signal transmitted from the signal source, the category of the signal source is determined. In a subsequent second step, an angular search for a signal source of said category is performed within the angular range, in which the search is interrupted in the direction in which a signal of the category is detected. In a subsequent third step, the detected signals are correlated with respect to time. When correlation is present, the direction to the signal source is determined by determination of the direction in which the signal source is detected. When correlation is not present, the search is continued until a new signal source of the category is detected, at which time the search is again interrupted and the third step is repeated. An apparatus is also disclosed.

7 Claims, 2 Drawing Sheets

METHOD AND DEVICE FOR DETERMINATION OF DIRECTION

BACKGROUND

The present invention relates to a method for the determination of the direction to a signal source.

The invention also relates to a device for the determination of the direction to a signal source.

In the field of surveillance it is important to quickly discover and classify the observations made. Signal surveillance is such an example where there is both a civilian and a military use. Such a use is to discover new signal sources. In this context signal sources are meant to comprise high frequency transmitters such as transmitting radar stations, radio transmitters of different types, jamming transmitters, etc.

The signal sources can geographically be situated anywhere in relation to the detection device. This prohibits the antenna of the detection device from having any specific directivity. Often, antennas with lateral beam widths of 90° or more are used. Also the vertical beam widths are large, often several tens of degrees. The antenna amplification and therefore also the sensitivity of the device become lower than for a device with an antenna with greater directivity. In most cases this means that signal sources are only detected when their signals are directed towards the detection device. As the signal sources also emit signals within very large frequency bands, it is required that the detection devices have very large bandwidths. The limited angular resolution and limited sensitivity in combination with the large bandwidth make detection devices of this type more to be considered as a warning device—they can indicate that a signal source exists but not where it is or in what direction it is.

Passive, non transmitting radar stations have been used for signal detection within the frequency range utilised by radar. The narrow beam of the antenna in a radar, that can be used as an accurate direction determiner, also results in that the antenna amplification is large enough so that even signal sources at large distances can be detected and this even if the beam of the antenna of the signal source (main beam) is not directed towards the detection device.

The problem with utilising a radar with a narrow antenna beam is that its antenna, to be able to cover a large angular area, has to conduct an extensive and therefor time consuming search procedure, especially in those cases when nothing is known about the direction or if there is a signal source at all.

It is also known to combine detection devices of the warning type and radar stations for a more accurate determination of the signal source. These solutions to the problem have had a limited usability because of deficiencies in the timely accordance of the measurement. The radar has in these cases not been able to determine if a detected signal source is the one intended by the warning device. The probability of the main beam of the signal source being directed towards the warning device at the same time as the radar station is directed towards the signal source is very small. The object of the present invention is thus to provide a method and a device for the determination of the direction of a signal source through co-operation between detection equipment of the warning type and a directional determining detection device such as a passive radar, in such a way as to eliminate the above-mentioned deficiencies such as i.a. the timely accordance of the measurement of a signal source, of earlier used methods.

SUMMARY

Said object is achieved by means of a method according to the present invention, the features of which will become apparent from the following description. In accordance with the invention, a method of determining a direction to a signal source by means of co-operation between a first device that determines the direction with a low angular accuracy and a second device that determines the direction with a high angular accuracy includes the steps of: using the first device to determine the direction to be in a certain angular range and to determine a category of the signal source based on a signal transmitted by the signal source and detected by the first device; searching for a signal source of the category within the certain angular range with the second device and interrupting the search when a signal from a signal source of the category is detected; correlating the signal detected by the first device with the signal detected by the second device with respect to time; and when correlation exists the direction is determined by determining the direction in which the second device detects the signal source, and when correlation does not exist, continuing searching until a new signal source of the category is detected, at which time the search is once again interrupted, after which the correlating step is repeated.

Said object is also achieved by means of a device according to the present invention, the features of which will become apparent from the following description. In accordance with the invention, a device for determining a direction to a signal source by means of co-operation between a first device that determines the direction with a low angular accuracy and a second device that determines the direction with a high angular accuracy includes the following: means, in the first device, for determining the direction within a certain angular range and for determining a category of the signal source by analyzing a signal transmitted by the signal source and detected by the first device; means, in the second device, for searching for a signal source of the category within the certain angular range and for interrupting the searching when a signal from a signal source of the category is detected; and means for correlating the signal detected by the first device with the signal detected by the second device with respect to time, and when correlation exists, for determining the direction from the direction in which the second device detects the signal source, and when correlation does not exist, for controlling the second device to continue searching until a new signal source of the catagory is detected, at which time the searching is once again interrupted, after which correlation with respect to time is repeated.

DETAILED DESCRIPTION

The invention uses a unique co-operation between a detection device of the warning type and a direction determining detection device which can be a radar station for example.

The warning device supplies different kinds of information about the signal source. As the antenna of the warning device does not have a pronounced directivity, it can for example be assumed that its lateral foot print contains four 90° antenna beams which gives the antenna a 360° coverage. Vertically, the beam angle of the antenna can be very large, from some tens of degrees to 80–90 degrees depending on the application. Because of this the warning device can only give the direction to the signal source with a very low angular accuracy, i.e. only give an angular area in which the signal source is situated. The warning equipment can also analyze the signal from the signal source to determine the category of the signal source by determining the frequency, pulse data such as pulse frequency, pulse length and pulse repetition rate, scanning pattern and other typical features of the signal.

The direction determining detection device, in the following referred to as the radar, can, on the other hand due to its small antenna beam with a high angular accuracy, determine the direction to a signal source. It can also, in a similar way to the warning device, determine the category of the signal source.

Figure 1:
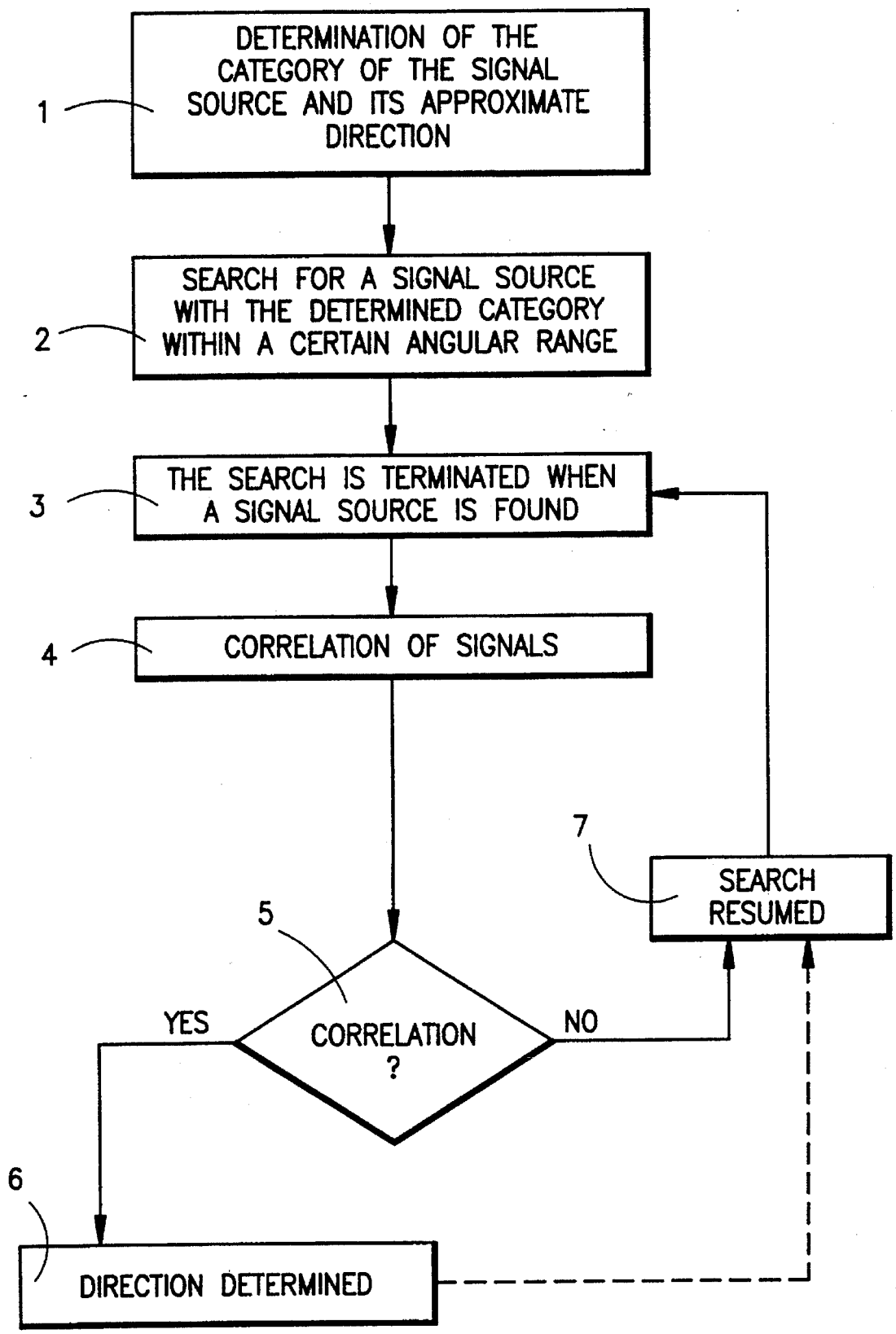
FIG. 1 shows a flow diagram of the method according to the invention.

The method according to the invention will now be described in closer detail with reference to the flow diagram in FIG. 1.

In a first step (1), a signal from a signal source is indicated in the warning device. Due to the relatively low sensitivity of the warning device, the signal source is only indicated for a short time when the signal source is directed towards the warning device. By determining from which antenna beam the indication is received, the warning device decides the approximate direction to the signal source. As has been previously described, the warning device determines the category of the signal source by measuring different characteristics. This information, attained in this way, is then transferred to the radar. The information received from the warning device is used as a starting point for the antenna of the radar to start in step (2) an angular search program in the given angular area. Due mainly to its considerably higher antenna amplification, the radar has a higher sensitivity compared to the warning device. This means that the radar has a capability to detect signal sources even though they are not transmitting in the radar/warning device direction. The probability that the radar, due to this will, "find" a signal source of the same category as the warning device indicated is therefore high. When this occurs, the radar stops its search program in step 3 and keeps its antenna beam directed towards the signal source.

Following this, step (4) continues with a comparison between the signal source detected by the radar and the signal source detected by the warning device. In addition to the previously described control of category, a time correlation of the received signals from the signal sources is performed. This is done to control for example whether identical pulse sequences appear at the same time, frequency changes follow the same pattern, etc. If the signal strength of the signal source varies with time, which can be the case if the signal source is an actively surveilling radar, the signal strength variations can also be correlated to establish if they follow the same pattern over time. With the help of the correlation, it can be established if the radar is directed, or not, towards the signal source that the warning device indicates. If the results from the correlation is positive, i.e. that the radar and the warning device are detecting the same signal source, then the direction to the signal source is decided in step (6) with the help of the alignment of the antenna of the radar. Thereafter the radar can continue its search program looking for further signal sources. This is indicated in FIG. 1 with the dotted line to the block (7).

If it turns out that the signals that are detected by the warning device and the radar do not coincide, then the antenna of the radar continues its search program in step (7) until a new signal source of the same category as that one submitted by the warning device is detected, whereby the radar once again stops its search program and the steps (3) to (5) are repeated until a correlation between the signal source detected by the radar and the one detected by the warning device is achieved.

Figure 2:
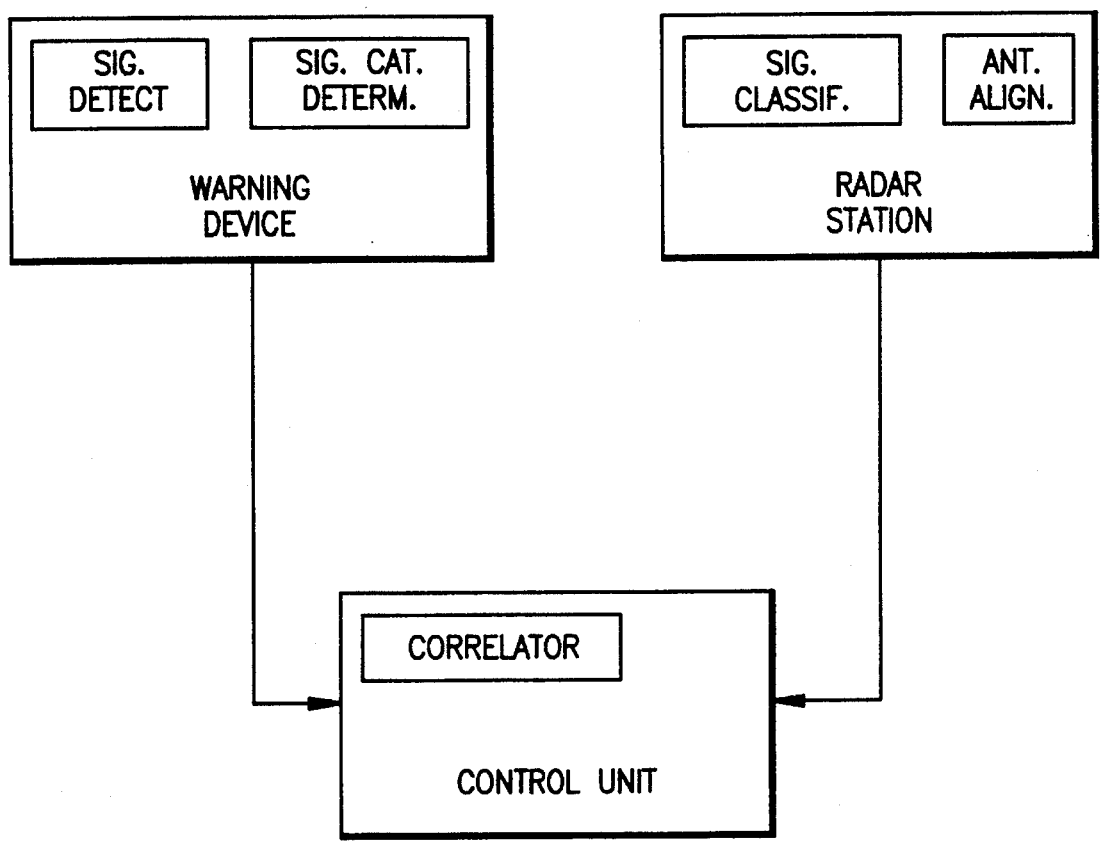
FIG. 2 shows a block diagram of a device according to the invention.

A device in which the described method is carried out comprises a warning device and a radar station and a control unit as illustrated by FIG. 2. The warning device comprises all the devices necessary to perform the described determinations of the categories of the signal sources. Accordingly, devices for frequency determination, measurement of pulse lengths, times, signal strength etc. are included. As these devices can be arranged by a man skilled in the art without difficulty and utilising known technology, they are not described in greater detail.

In a corresponding manner, the radar station comprises devices necessary for alignment of the antenna and for classification of the signal from the signal source according to what has been described. Nor do these devices pose any problems for the man skilled in the art.

The control unit controls the co-ordination between the warning device and the radar. It therefore comprises devices for time correlation of the signals from the signal source detected respectively by the radar and the warning device and with guidance from the result of the correlation decides if it is the same signal source or not that is being detected. In case that it is not the same signal source being detected, the control unit control the radar to continue with its search program.

The invention is not limited to the described embodiments, but may be varied freely within the scope of the appended claims.

What is claimed is:

1. A method of determining a direction to a signal source by means of co-operation between a first device that determines the direction with a low angular accuracy and a second device that determines the direction with a high angular accuracy, comprising the steps of:

using the first device to determine the direction to be in a certain angular range and to determine a category of the signal source based on a signal transmitted by the signal source and detected by the first device;

searching for a signal source of the category within the certain angular range with the second device and interrupting the search when a signal from a signal source of the category is detected;

correlating the signal detected by the first device with the signal detected by the second device with respect to time; and when correlation exists the direction is determined by determining the direction in which the second device detects the signal source, and when correlation does not exist, continuing searching until a new signal source of the category is detected, at which time the search is once again interrupted, after which the correlating step is repeated.

2. The method of claim 1, wherein the category of the signal source is determined by analyzing the signal transmitted by the signal source with respect to at least one of frequency and pulse data.

3. The method of claim 1, wherein the signal detected by the first device is correlated with respect to time with the signal detected by the second device by at least one of verifying whether identical pulse patterns appear at the same time and correlating signal strength variations of the detected signals.

4. A device for determining a direction to a signal source by means of co-operation between a first device that determines the direction with a low angular accuracy and a second device that determines the direction with a high angular accuracy, comprising:

means, in the first device, for determining the direction within a certain angular range and for determining a category of the signal source by analyzing a signal transmitted by the signal source and detected by the first device;

means, in the second device, for searching for a signal source of the category within the certain angular range and for interrupting the searching when a signal from a signal source of the category is detected; and means for correlating the signal detected by the first device with the signal detected by the second device with respect to time, and when correlation exists, for determining the direction from the direction in which the second device detects the signal source, and when correlation does not exist, for controlling the second device to continue searching until a new signal source of the category is detected, at which time the searching is once again interrupted, after which correlation with respect to time is repeated.

5. The device of claim 4, wherein the first device, for determination of the category of the signal source, analyzes the signal transmitted by the signal source with respect to at least one of frequency and pulse data.

6. The device of claim 4, wherein the second device comprises a radar with a narrow antenna beam with a high angular accuracy.

7. The device of claim 4, wherein the correlating means, upon correlation with respect to time, verifies at least one of whether identical pulse patterns appear at the same time and whether correlation exists between signal strength variations of the detected signals.

* * * * *